(No Model.)
H. R. SMITH.
HORSE POWER.
No. 318,518. Patented May 26, 1885.
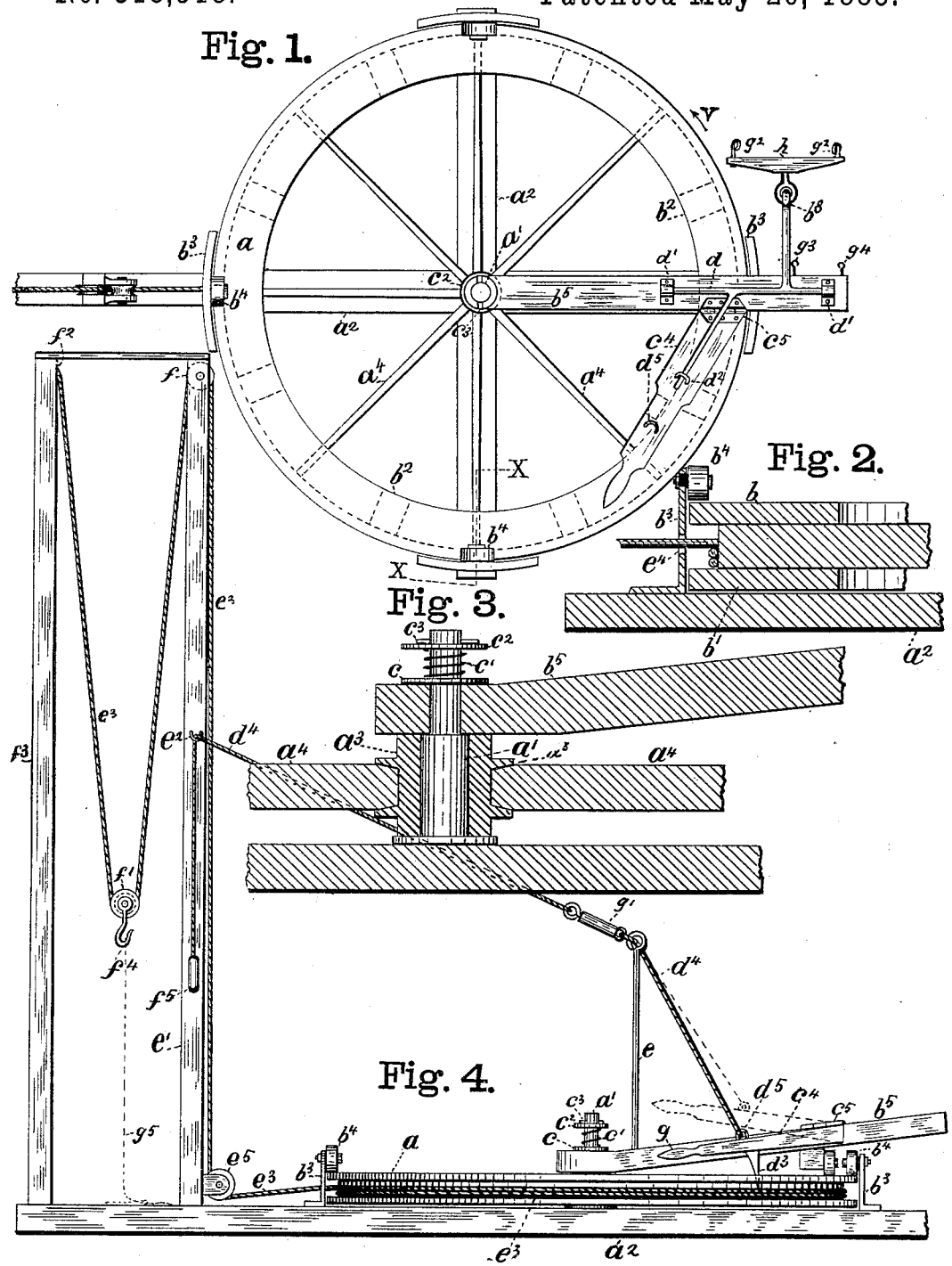
Witnesses.
Jennie M. Caldwell.
Arthur J. Sangster.
Inventor.
Heman R. Smith.
By James Sangster
Atty.

UNITED STATES PATENT OFFICE.

HEMAN R. SMITH, OF ATTICA, NEW YORK.

HORSE-POWER.

SPECIFICATION forming part of Letters Patent No. 318,518, dated May 26, 1885.

Application filed February 9, 1885. (No model.)

*To all whom it may concern:*

Be it known that I, HEMAN R. SMITH, a citizen of the United States, residing in Attica, in the county of Wyoming and State of New York, have invented certain new and useful Improvements in Horse-Powers, of which the following is a specification.

The object of my invention is to provide the means for hoisting hay or other articles, whereby a saving of time and labor is effected, all of which will be fully and clearly hereinafter shown, described, and claimed, by reference to the accompanying drawings, in which—

Figure 1 is a plan or top view. Fig. 2 is a section through a portion of the mechanism in line X X, Fig. 1. Fig. 3 is a section through the hub and a portion of the arms of the wheel, &c., and Fig. 4 represents a side elevation of the machine complete.

My invention is designed for saving the work of the horse as much as possible by avoiding the necessity of backing after the load has been hoisted.

In said drawings, $a$ represents a horizontal wheel placed upon a vertical pin, $a'$. This pin $a'$ is rigidly secured to the supporting-frame $a^2$ by countersunk-head screws, or by other well-known means. The hub $a^3$ is usually made of cast-iron, and wooden arms $a^4$ inserted in the sockets $a^5$ (see Fig. 3) and held in place by the rim of the wheel or pulley. The arms $a^4$ are secured at the outer ends by bolts or screws to the rims $b$ $b'$. The ends of the arms come to within about two inches of the periphery of the wheel, and between them are one or more blocks, $b^2$, (shown by dotted lines in Fig. 1,) or the blocks may be arranged so so as to fill the space between the arms, as shown in Fig. 4. The object being to leave a groove around the periphery of the wheel sufficiently large for the rope to lie in. $b^3$ represents shields for keeping the rope in place in the groove around the wheel, and also for holding the friction-rollers $b^4$, for keeping the wheel $a$ in a horizontal position.

The bar $b^5$, to which the horse is attached, is mounted on the pin $a'$. On top of it is placed a washer, $c$, a spiral spring, $c'$, and a washer, $c^2$, the whole being secured by a pin, $c^3$.

$c^4$ is a trip-arm hinged to the arm or bar $b^5$ by a hinge, $c^5$, made in any well-known way.

$d$ represents the automatic trip, secured to the bar $b^5$ in bearings $d'$, and to the trip-arm by a staple, $d^2$, on said arm. (See Fig. 1.) The front end of the automatic trip is provided with an arm having a hook, $b^8$, to which is attached a whiffletree, $h$.

The tripping-bar $c^4$ is provided with a downwardly-projecting piece, $d^3$, which catches against either of the arms $a^4$, so that when thus engaged the wheel may be made to turn in the direction of the arrow V until the tripping-bar is lifted up, which draws the part $d^3$ up away from the wheel $a$. The cord or rope $d^4$ for operating the hand-trip is connected to it by a staple, $d^5$. It runs from the tripping-bar $c^4$ up and through an eye in the vertical bar $e$, and from thence to the post $e'$, through a staple, $e^2$, (or over a small pulley,) and passes down far enough so as to be conveniently reached by the hand.

The wheel $a$ is provided with a rope or cable, $e^3$. It is made fast to the wheel, and from thence runs through an opening, $e^4$, in one of the angle plates or shields $b^3$, (see Fig. 2,) then to and under a grooved pulley, $e^5$. From that it passes up to and over the pulley $f$, and down to and under the pulley $f'$. From thence it passes up, and is well secured at the top $f^2$ of the post $f^2$, or to some other convenient point of support.

To the pulley $f'$ is connected, in the usual way, a hook, $f^4$, to which a hay-fork or other equivalent device may be connected.

To the rope $d^4$ is connected a swivel, $q'$, so as to allow the rope to turn at that point, and thereby prevent it from twisting during the operation of the wheel $a$.

The operation of the invention is as follows: The horse is connected, in the usual way, either to the whiffletree-hooks $g^2$, or to either of the hooks $g^3$ or $g^4$, and by moving in the direction of the arrow V the rope $e^3$ is wound around the wheel $a$, thereby drawing the hook $f^4$ upward, and any load that may be connected to it. After the load is thus drawn up to the point desired, it is taken off from the hook $f^4$, thereby taking the tension off from the rope.

The horse is now stopped, and if the automatic trip is used the weight of the whiffletree drops it down and lifts the tripping-arm $c^4$, which disengages the part $d^3$, thereby releasing the wheel, so that by pulling on the cord $g^3$ (after the load has been taken off) the pulley and hook $f^4$ may be drawn down to receive another load. During this operation the wheel $a$ is turned backward and the rope unwinds from it. This operation avoids the necessity of the horse walking backward while the hook $f^4$ is being drawn down, and it is much easier to operate than it would be to drag the rope along the ground while pulling down the hook $f^4$ in the usual way. When the automatic trip is not used, the hand-trip may be operated by pulling at the lower end or handle, $f^3$, of the cord $d^4$. The effect of this would also be to lift the part $d^3$ and disengage it from the wheel $a$. If, as sometimes happens, a bad horse is used, and it is necessary for a driver to follow him, the tripping-bar $c^4$ may be lifted by the handle $g$.

The object of the spiral spring $c'$ is to prevent (by the friction it causes) the wheel $a$ from turning backward too easily; but sometimes this may not be required.

When the device is used for raising hay, &c., in a barn, the post $e'$ may represent the side of a barn, in which case the pulley $f'$ and hook $f^4$, &c., would be inside of the barn.

In place of the arms $a^4$, upwardly-projecting teeth may be used to engage with the part $d^3$.

I claim as my invention—

1. In a horse-power, a horizontal wheel provided with a rope, $e^3$, arms $a^4$, to engage with a tripping-bar, and shields $b^3$, provided with friction-rollers $b^4$, for keeping the rope in place and the wheel in a horizontal position, in combination with a bar or arm, $b^5$, having hooks $g^3$ or $g^4$, and provided with a tripping-arm, $c^4$, having a bar, $d^3$, for the purposes described.

2. In the combination above specified, the pivoted bar $d$, connected with the tripping-arm and having a hook for connecting with a whiffletree for operating the tripping device automatically by the weight of the whiffletree.

3. In the combination hereinbefore described, the hand tripping-lever adapted to be operated by hand near the horse, substantially as described, in combination with the rope or cord $d^4$, vertical bar $e$, and swivel $g'$, the rope passing to a point convenient to be operated near the load, substantially as specified.

HEMAN R. SMITH.

Witnesses:
JENNIE M. CALDWELL,
A. J. SANGSTER.